United States Patent
Cui et al.

(10) Patent No.: US 10,299,137 B2
(45) Date of Patent: May 21, 2019

(54) BASE STATION SIDE DEVICE AND METHOD AND USER SIDE DEVICE AND METHOD FOR WIRELESS COMMUNICATION

(71) Applicant: SONY CORPORATION, Konan Minato-ku Tokyo (JP)

(72) Inventors: Qimei Cui, Beijing (CN); Xiaodong Xu, Beijing (CN); Jiahui Liu, Beijing (CN); Ningyu Chen, Beijing (CN); Xiang Zhou, Beijing (CN); Yu Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 78 days.

(21) Appl. No.: 15/518,687

(22) PCT Filed: Oct. 13, 2015

(86) PCT No.: PCT/CN2015/091841
§ 371 (c)(1),
(2) Date: Apr. 12, 2017

(87) PCT Pub. No.: WO2016/062213
PCT Pub. Date: Apr. 28, 2016

(65) Prior Publication Data
US 2017/0230839 A1    Aug. 10, 2017

(30) Foreign Application Priority Data
Oct. 20, 2014   (CN) ........................ 2014 1 0559279

(51) Int. Cl.
*H04W 16/14*    (2009.01)
*H04W 74/00*    (2009.01)
*H04W 74/08*    (2009.01)

(52) U.S. Cl.
CPC ......... *H04W 16/14* (2013.01); *H04W 74/004* (2013.01); *H04W 74/008* (2013.01); *H04W 74/0808* (2013.01); *Y02D 70/00* (2018.01)

(58) Field of Classification Search
None
See application file for complete search history.

(56) References Cited

U.S. PATENT DOCUMENTS 8,641,126 B2    2/2014   Visser et al.
8,879,576 B2    11/2014  Chen
(Continued)

FOREIGN PATENT DOCUMENTS

| CN | 102202028 A | 9/2011 |
| CN | 102843696 A | 12/2012 |
| GB | 201121434 | 1/2012 |

OTHER PUBLICATIONS

International Search Report dated Jan. 12, 2016 in PCT/CN2015/091841 filed Oct. 13, 2015.
(Continued)

*Primary Examiner* — Eunsook Choi
(74) *Attorney, Agent, or Firm* — Xsensus LLP

(57) ABSTRACT

A base station side device and method and user side device and method for wireless communication. The device includes: a sending unit configured to send instruction on an unauthorized frequency band detection to a user equipment (UE) served by the cell where the device is located; a receiving unit configured to receive from the UE a signal representing occupancy status of the unauthorized frequency band; and a determination unit configured to determine based on the signal received by the receiving unit whether to use the unauthorized frequency band for communication, the unauthorized frequency band occupancy status includes occupied/idle status and the type of the occupying system, (Continued)

and the type of occupying system includes one of an unauthorized communication system and an authorized communication system.

18 Claims, 7 Drawing Sheets

(56) References Cited

U.S. PATENT DOCUMENTS

| | | | | |
|---|---|---|---|---|
| 9,913,297 | B2* | 3/2018 | Ahn | H04L 1/0025 |
| 10,064,064 | B2* | 8/2018 | Han | H04W 16/14 |
| 10,064,230 | B2* | 8/2018 | Gao | H04W 76/14 |
| 2011/0221231 | A1 | 9/2011 | Visser et al. | |
| 2011/0287794 | A1* | 11/2011 | Koskela | H04W 28/08 |
| | | | | 455/509 |
| 2012/0039284 | A1* | 2/2012 | Barbieri | H04W 48/10 |
| | | | | 370/329 |
| 2012/0086233 | A1 | 4/2012 | Visser et al. | |
| 2012/0086234 | A1 | 4/2012 | Visser et al. | |
| 2013/0156019 | A1 | 6/2013 | Chen | |
| 2016/0157233 | A1* | 6/2016 | Bai | H04L 5/001 |
| | | | | 370/329 |
| 2017/0086213 | A1* | 3/2017 | Kalhan | H04W 76/14 |
| 2017/0164208 | A1* | 6/2017 | Nielsen | H04W 28/08 |
| 2017/0289937 | A1* | 10/2017 | Urabayashi | H04W 16/14 |
| 2018/0175975 | A1* | 6/2018 | Um | H04L 1/1816 |
| 2018/0227106 | A1* | 8/2018 | Kim | H04L 1/00 |
| 2018/0242225 | A1* | 8/2018 | Malladi | H04L 5/0007 |

OTHER PUBLICATIONS

"Candidate solutions for LAA operation", LG Electronics, 3GPP TSG RAN WG1 Meeting #78bis, 7.3.2.3, R1-144042, Oct. 10, 2014, 6 pages.

"Hidden node problem and potential solutions for LAA", Alcatel-Lucent Shanghai Bell, Alcatel-Lucent, 3GPP TSG RAN WG1 Meeting #78bis, 7.3.2.3, R1-144084, Oct. 10, 2014, 4 pages.

"Required functionalities and design targets of LAA", ZTE, 3GPP TSG-RAN1#78bis, 7.3.2.2, R1-143827, Oct. 10, 2014, 7 pages.

"Inter-operator and Inter-RAT co-existence techniques for LAA using LTE", NTT DOCOMO, 3GPP TSG RAN WG1 Meeting #78bis, 7.3.2.3, R1-144339, Oct. 10, 2014, 6 pages.

\* cited by examiner

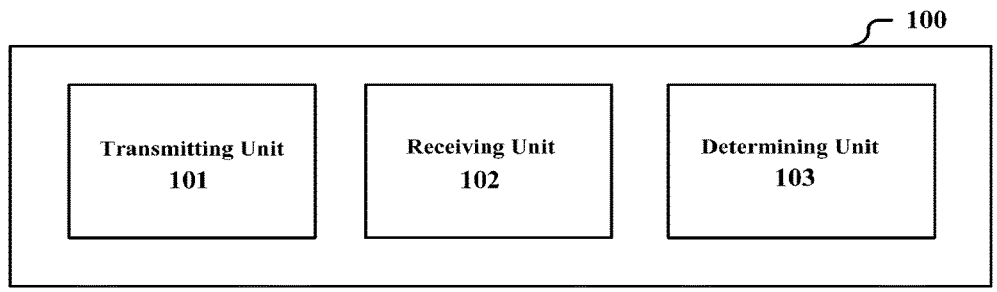
Figure 1
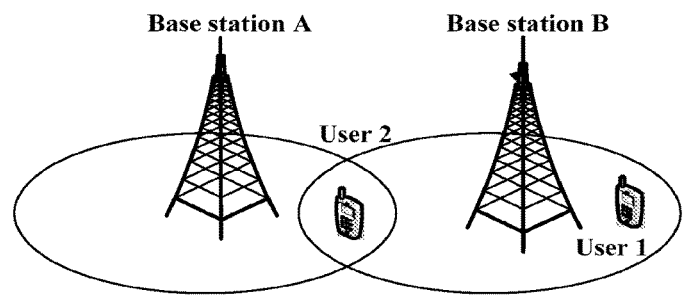
Figure 2
| Unlicensed frequency band detection signal | Meaning |
|---|---|
| 00 | user does not need to detect the unlicensed frequency band |
| 01 | user starts to detect the unlicensed frequency band |
| 10 | user detects a DRS on the unlicensed frequency band |
Figure 3

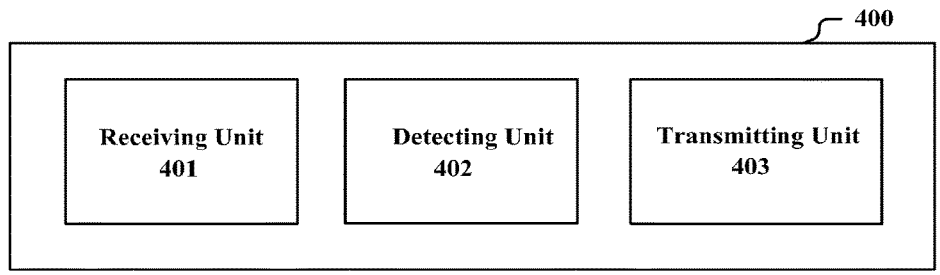
Figure 9
| unlicensed frequency band state indication signal | Meaning |
|---|---|
| 00 | unlicensed frequency band is idle |
| 01 | unlicensed frequency band is occupied by a licensed communication system |
| 10 | unlicensed frequency band is occupied by a unlicensed communication system |
| 11 | another unlicensed communication system requests to access |
Figure 10
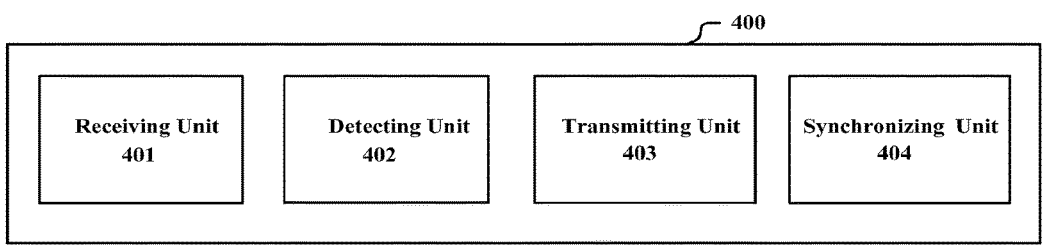
Figure 11

BASE STATION SIDE DEVICE AND METHOD AND USER SIDE DEVICE AND METHOD FOR WIRELESS COMMUNICATION

FIELD OF THE INVENTION

The embodiments of the present disclosure generally relate to the field of wireless communications, and in particular to an apparatus and a method at a base station side for wireless communications as well as an apparatus and a method at a user side for wireless communications. More specifically, the embodiments of the present disclosure relate to a technology that multiple communication systems occupy an unlicensed frequency band in common with assistance of a user terminal.

BACKGROUND OF THE INVENTION

Long term evolution (LTE) is long term evolution of a universal mobile telecommunications system (UTMS) technology standard established by a 3GPP organization. Key transmission technologies such as OFDM and multiple-antenna multiple-input multiple-output (MIMO) are introduced in an LTE system, thereby increasing a spectrum efficiency and a data transmission rate significantly, and enabling support of multiple types of bandwidth allocation. The LTE wireless network structure is more flattened, thereby decreasing a system time delay, reducing a network building cost and maintenance cost.

Initially, the LTE is designed to be only applied to a licensed frequency band, and respective operators occupy different licensed frequency bands. However, with rapid increasing of wireless broadband data within the world range, the LTE network develops rapidly. In order to improve the service quality, the operators pay attention to an unlicensed frequency band. In addition, making sufficient use of the unlicensed frequency band can also enable utilization of the existing LTE hardware resources of the operators and the device manufactures as much as possible. Therefore, it needs to develop a sharing technology for enabling multiple unlicensed communication systems to perform communications using the unlicensed frequency band simultaneously, thereby improving the frequency utilizing efficiency of the unlicensed frequency band.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an apparatus at a base station side for wireless communications is provided, which includes: a transmitting unit, configured to transmit, to a user equipment served by a cell where the apparatus is located, an instruction on detection of an unlicensed frequency band; a receiving unit, configured to receive, from the user equipment, a signal indicating an occupation status of the unlicensed frequency band; and a determining unit, configured to determine, based on the signal received by the receiving unit, whether to perform communications using the unlicensed frequency band, where the occupation status of the unlicensed frequency band includes occupied/idle and a type of a system occupying the unlicensed frequency band, the type of the system occupying the unlicensed frequency band including an unlicensed communication system and a licensed communication system.

According to another aspect of the present disclosure, a method at a base station side for wireless communications is provided, which includes: transmitting, to a user equipment, an instruction on detection of an unlicensed frequency band; receiving, from the user equipment, a signal indicating an occupation status of the unlicensed frequency band; and determining, based on the received signal, whether to perform communications using the unlicensed frequency band, where the occupation status of the unlicensed frequency band includes occupied/idle and a type of a system occupying the unlicensed frequency band, the type of the system occupying the unlicensed frequency band including an unlicensed communication system and a licensed communication system.

According to yet another aspect of the present disclosure, an apparatus at a user side for wireless communications is further provided, which includes: a receiving unit, configured to receive, from a base station serving the apparatus, an instruction on detection of an unlicensed frequency band; a detecting unit, configured to detect an occupation status of the unlicensed frequency band; and a transmitting unit, configured to transmit, according to the occupation status detected by the detecting unit, an unlicensed frequency band state indication signal to the base station, where the occupation status of the unlicensed frequency band includes occupied/idle and a type of a system occupying the unlicensed frequency band, the type of the system occupying the unlicensed frequency band including an unlicensed communication system and a licensed communication system.

According to another aspect of the present disclosure, a method at a user side for wireless communications is provided, which includes: receiving an instruction on detection of an unlicensed frequency band from a base station; detecting an occupation status of the unlicensed frequency band; and transmitting, according to the detected occupation status, an unlicensed frequency band state indication signal to the base station, where the occupation status of the unlicensed frequency band includes occupied/idle and a type of a system occupying the unlicensed frequency band, the type of the system occupying the unlicensed frequency band including an unlicensed communication system and a licensed communication system.

According to other aspects of the present disclosure, there are also provided computer program codes and computer program products for implementing the above mentioned method for a base station side and method at a user side for wireless communications as well as a computer readable storage medium in which computer program codes for implementing the above mentioned method for a base station side and method at a user side for wireless communications are recorded.

With the apparatus and method for a base side of wireless communications and the apparatus and method at a user side for wireless communications according to the present disclosure, information interchange between different communication systems is achieved with assistance of the user equipment, thereby performing transmission in cooperation even if the communication systems belong to different operators.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings:

FIG. 1 shows a block diagram of a structure of an apparatus at a base station side for wireless communications according to an embodiment of the present disclosure;

FIG. 2 shows a schematic diagram of two communication systems;

FIG. 3 shows a diagram of an example of definition of an unlicensed frequency band detection signal (UBDS);

FIG. 9 shows a block diagram of a structure of an apparatus at a user side for wireless communications according to an embodiment of the present disclosure;

FIG. 10 shows a diagram of an example of definition of an unlicensed frequency band state indication signal (USIS);

FIG. 11 shows a block diagram of an apparatus at a user side for wireless communications according to another embodiment of the present disclosure;

DETAILED DESCRIPTION OF THE EMBODIMENTS

Figure 4:
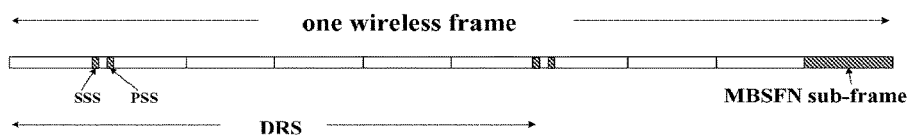
FIG. 4 shows a diagram of an example of a composition of an unlicensed frequency band access requesting signal (LIRAS)

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

FIG. 1 shows a block diagram of a structure of an apparatus 100 at a base station side for wireless communications according to an embodiment of the present disclosure. The apparatus 100 includes: a transmitting unit 101, configured to transmit, to a user equipment served by a cell where the apparatus 100 is located, an instruction on detection of an unlicensed frequency band; a receiving unit 102, configured to receive, from the user equipment, a signal indicating an occupation status of the unlicensed frequency band; and a determining unit 103, configured to determine, based on the signal received by the receiving unit 102, whether to perform communications using the unlicensed frequency band, where the occupation status of the unlicensed frequency band includes occupied/idle and a type of a system occupying the unlicensed frequency band, and the type of the system occupying the unlicensed frequency band includes an unlicensed communication system and a licensed communication system.

As described above, in addition to performing communications occupying a licensed frequency band, a communication system corresponding to the apparatus 100 (also referred as a target communication system) may expect to perform communications using the unlicensed frequency band in the case of a great communication load. The unlicensed frequency band described herein is with respect to the target communication system, and the unlicensed frequency band itself may have been allocated to a certain licensed communication system. In this case, the target communication system usually needs to occupy the unlicensed frequency band without influencing the normal communication of the licensed communication system.

The licensed communication system described here may be a Wi-Fi communication system for example, and a target communication system may be an LTE communication system or other communication systems. For the target communication system, the unlicensed frequency band is a Wi-Fi frequency band. It should be understood that, the unlicensed frequency band may be legal communication resources of other communication systems such as a broadcast and television frequency band or a radar frequency band, and those skilled in the art may apply specific technical solutions to other communication systems according to contents of the present disclosure. Preferably, the target communication system in the present disclosure is designed as an LTE communication system. The apparatus 100 may be implemented as any type of evolved node B (eNB), such as a macro eNB and a small eNB. The small eNB may be an eNB such as a pico eNB, a micro eNB, and a home (femto) eNB that covers a cell smaller than a macro cell. Alternatively, the apparatus 100 may be implemented as any other types of base stations such as a NodeB and a base transceiver station (BTS). The apparatus 100 may include: a main body (that is also referred to as a base station apparatus) configured to control radio communication, and one or more remote radio heads (RRH) disposed in a different place from the main body. Further, various types of terminals, which will be described below, may each operate as the apparatus 100 by performing the base station function temporarily or semi-permanently. In an example of the present disclosure, the apparatus 100 determines, according the unlicensed frequency band occupation state signal received from the user equipment, whether the unlicensed frequency band is available for the present communication system. If the unlicensed frequency band is available, a carrier on the unlicensed frequency band is configured as one of component carriers of the user equipment served by the apparatus 100, such that carriers on the unlicensed frequency band provide transmission service for the user equipment together with component carriers on the licensed frequency band in a way of carrier aggregation. In a preferred example, the apparatus 100 only configures the carriers on the unlicensed frequency band to provide service on the data plane, for example, configures the carriers as secondary carriers to be used rather than primary carriers.

When the apparatus 100 tries to use or user equipments (for example D2D communication) served by the apparatus 100 expect to use the unlicensed frequency band to perform communications, the apparatus 100 responsible for allocating transmission resources controls its user equipments to assist in detecting the unlicensed frequency band. Specifically, the transmitting unit 101 transmits, to user equipments in a cell where the apparatus 100 is located, signaling on detection of the unlicensed frequency band, and the signaling may instruct the user equipments to detect or not to detect the unlicensed frequency band for example. The apparatus 100 may judge whether the user equipments are to detect the unlicensed frequency band in many ways. For example, the apparatus 100 may be configured not to activate the unlicensed frequency band, and in this case, an instruction not to detect the unlicensed frequency band is transmitted, or no instruction on detection is transmitted.

In addition, in an example, the determining unit 103 is further configured to determine interferences on the unlicensed frequency band before the transmitting unit 101 transmits the above instruction, and the transmitting unit 101 is configured to transmit, to the user equipment, an instruction to detect the unlicensed frequency band when the determining unit 103 determines that the interferences are lower than a predetermined threshold. In other words, the interferences on the unlicensed frequency band may be determined by the base station side firstly, and then, on the basis of the preliminary detection at the base station side, the base station side judges, based on the interference conditions, whether to need a user equipment to assist in detecting. In an example, if the base station side determines that the interferences are higher than the predetermined threshold, it is determined that the corresponding unlicensed frequency band is not suitable to be used and the user equipment does not need to perform further detection; otherwise, an instruction to detect the unlicensed frequency band is transmitted. In another example, the apparatus 100 at the base station side judges whether the interferences are from a licensed communication system or an unlicensed communication system. In the case that the interferences are from the licensed communication system, the transmitting unit 101 does not transmit an instruction on detection of the unlicensed frequency band to the user equipment or transmits an instruction not to detect the unlicensed frequency band to the user equipment.

Detection of the unlicensed frequency band by the user equipment can avoid a problem of hidden base stations as much as possible. FIG. 2 schematically shows two communication systems (such as two LTE cells). In FIG. 2, a communication system corresponding to a base station B is using the unlicensed frequency band, and a base station A tries to access in the unlicensed frequency band. However, a user of the base station B (indicated by a user 1 in FIG. 2) is located at a right side of the base station A and far away from the base station A. Therefore, the base station A does not detect the communication between the base station B and the user 1 on the unlicensed frequency band when detecting interferences on the unlicensed frequency band, and determines that the interferences are lower than a predetermined threshold. In this case, the base station B is a hidden base station for the base station A. It may be seen that, if the base station A accesses in the unlicensed frequency band in this case, strong interferences will be generated between users of the base station A and the base station B. In contrast, by enabling the user equipments of the base station A such as a user 2 closer to the user 1 of the base station B to detect the unlicensed frequency band, it is possible to detect the strong interferences on the unlicensed frequency band from the user of the base station B, thereby determining an occupation status of the unlicensed frequency band more accurately.

In addition, as an example, when determining that the above interferences are higher than the predetermined threshold, the determining unit 103 judges whether the interferences are from an unlicensed communication system or a licensed communication system. In the case that the determining unit 103 determines that the interferences higher than the threshold are from the unlicensed communication system, it determines to require sharing transmission resources on the unlicensed frequency band according to a coexistence protocol with other unlicensed communication systems. In a preferred example, the transmitting unit 101 broadcasts an access requesting signal on the unlicensed frequency band, such that the communication system which is occupying the unlicensed frequency band currently is informed, and shares or retreats in a time division/frequency division manner according to the predetermined coexistence protocol. In another aspect, in the case that the determining unit 103 determines that the interferences higher than the threshold are from the licensed communication system, it is determined not to use the corresponding unlicensed frequency band.

For example, in the case that the determining unit 103 determines that the interferences are from a Wi-Fi system, the apparatus 100 gives up using the unlicensed frequency band; and in the case that the determining unit 103 determines that the interferences are from another LTE system, the apparatus 100 tries to share the unlicensed frequency band with the LTE system by broadcasting the access requesting signal. A format and related processing of the broadcasted access requesting signal are described in detail later.

In the case that the user equipments is instructed to detect the unlicensed frequency band, the receiving unit 102 receives, from the user equipment, a signal indicating an occupation status of the unlicensed frequency band detected by the user equipment. The signal indicates whether the unlicensed frequency band is occupied and a type of a communication system occupying the unlicensed frequency band, that is, the communication system is a licensed communication system or another unlicensed communication system, for example the communication system is a Wi-Fi system or another LTE system. The determining unit 103 determines whether to perform communications using the unlicensed frequency band according to this signal. The user equipment may detect interferences around. For example, if the interferences are lower than a threshold TH, the user equipment determines that the frequency band is not occupied; and in contrast, if the user equipment detects that the interferences are higher than the threshold TH, it needs to further determine whether the interferences are from the licensed communication system or another unlicensed communication system. In the case that the communication system which may use the Wi-Fi frequency band is the LTE system and the Wi-Fi system for example, a Wi-Fi signal and another LTE signal may be distinguished by detecting whether there is a signal peculiar to the LTE system such as a PSS/SSS on the frequency band, for example.

In an example, the determining unit 103 is configured to, in the case of determining, based on the signal received by the receiving unit 102, that the unlicensed frequency band is occupied by the unlicensed communication system, determine to share the unlicensed frequency band with the unlicensed communication system in a cooperation manner, and the transmitting unit 101 is configured to broadcast an access requesting signal on the unlicensed frequency band; and/or the determining unit 103 is configured to, in the case of determining, based on the signal received by the receiving unit 102, that the unlicensed frequency band is occupied by the licensed communication system, determine not to use the unlicensed frequency band.

It should be noted that, although the case that the user equipment can distinguish the unlicensed communication system and the licensed communication system is described above, the following case may also exist: the user equipment only determines a type of a communication system which is the same as the communication system where the user equipment is located. In other words, the user equipment does not distinguish the unlicensed communication system and the licensed communication system. In this case, the determining unit 103 may be configured to use the unlicensed frequency band in cooperation with only communication systems of the same type, and not to cooperate for a communication system of a different type while giving up the unlicensed frequency band with high interferences.

In an example of the present disclosure, in order to judge whether the unlicensed frequency band can be used, it is possible to set a priority level of using the unlicensed frequency band for each communication system. The determining unit 103 may determine to cooperate or give up by comparing the priority level of the present communication system with that of a communication system occupying the unlicensed frequency band. For example, on the broadcast and television frequency band, the Wi-Fi system and the LTE system both are the unlicensed systems. In the case that the Wi-Fi system and the LTE system each may use the broadcast and television frequency band, a high priority level may be set for the Wi-Fi communication system and a low priority level may be set for the LTE system. If it is detected that the communication system occupying the unlicensed frequency band has a high priority level, the target communication system gives up using the unlicensed frequency band; otherwise, the target communication system determines to perform cooperation.

In addition, the determining unit 103 is configured to determine to perform communications using the unlicensed frequency band in the case that the unlicensed frequency band is idle. The transmitting unit 101 is further configured to, after the determining unit 103 determines to perform communications using the unlicensed frequency band, transmit a discovery reference signal (DRS) and transmit to a corresponding user equipment an instruction to start to detect a discovery reference signal DRS of the present cell on the unlicensed frequency band. The DRS is used by the user equipment to perform coarse synchronization. The transmitting unit 101 is further configured to transmit the DRS periodically on the unlicensed frequency band.

The above instruction transmitted by the transmitting unit 101 may be transmitted via high level signaling on the licensed frequency band, such as radio resource control (RRC) signaling. That is, the instruction is transmitted to a specific user, thereby selectively requiring the specific user equipment to perform detection. The instruction may also be transmitted through a physical layer of the licensed frequency band for example a system information block (SIB), i.e., transmitted by broadcasting, thereby transmitting the instruction in a shortcut manner. Of course, the transmitting unit 101 may transmit the above instruction using another appropriate signaling or manner.

Hereinafter, a signaling structure of the instruction on detection of the unlicensed frequency band which is transmitted by the transmitting unit 101 is described with reference to FIG. 3. As shown in FIG. 3, the instruction on detection of the unlicensed frequency band is indicated by an unlicensed band detection signal (UBDS), which occupies 2 bits. In the case that the UBDS is "00", a user is instructed not to detect the unlicensed frequency band; in the case that the UBDS is "01", the user is instructed to detect the unlicensed frequency band; and in the case that the UBDS is "10", it is indicated that the determining unit 103 has determined to perform communications using the unlicensed frequency band, and the DRS would be transmitted on the unlicensed frequency band before data transmission is performed, such that the user of the base station performs coarse synchronization. The transmitting unit 101 transmits the UBDS "10" to a user to instruct the user to start to detect the DRS on the unlicensed frequency band.

It should be understood that, the signaling structure is only exemplary and is not limited thereto. Any other appropriate ways may be used.

As described above, when the determining unit 103 determines that the unlicensed frequency band is occupied by another unlicensed communication system, the transmitting unit 101 broadcasts an access requesting signal on the unlicensed frequency band (Unlicensed-band Request of Access Signal, LIRAS). A base station and a user equipment of the accessed unlicensed communication system may obtain the signal by detecting periodically, thereby knowing that another unlicensed communication system requests to use the unlicensed frequency band.

The access requesting signal may include an MBSFN sub-frame and a DRS signal. FIG. 4 shows an example of a schematic structure of the access requesting signal, where a combination of the MBSFN sub-frame and the DRS signal is used to distinguish from other broadcast signals. The DRS may be used to distinguish different unlicensed communication systems (for example different LTE cells). For example, a PSS/SSS in the DRS shown in FIG. 4 contains identification information of a corresponding cell, and the identification information further contains information of an operator of the cell. Specific contents on the MBSFN sub-frame and the DRS may be referred to the LTE-A related standard established by the 3GPP organization, which is not described in detail in the present disclosure. It should be understood that, the composition of the access requesting signal is not limited to the example shown in FIG. 4 and may have various variations.

In certain cases, the access requesting signal may be so weak that the base station and the user of the accessed communication system can not detect the access requesting signal and thus do not perform the corresponding cooperation. In this case, the apparatus 100 still obtains a detection result of high interferences on the unlicensed frequency band after transmitting the access requesting signal, and the transmitting unit 101 is configured to increase a power of the access requesting signal within a certain range, such that the access requesting signal is detected by another communication system which has occupied the unlicensed frequency band.

In an example of the present disclosure, a predetermined cooperation protocol between the unlicensed communication systems may be as follows. For example, it is assumed that a period of the cooperation transmission is T, that is, multiple unlicensed communication systems occupy the unlicensed frequency band in a time order to perform data transmission within each period T. If the already accessed unlicensed communication system does not change a transmission pattern within one period T, the transmitting unit 101 of a communication system to be accessed gradually increases the power of the access requesting signal within a range C. When the power of the access requesting signal reaches an upper limit of the range but the access requesting signal is not detected by another communication system, the transmitting unit 101 stops transmitting the access requesting signal, and the determining unit 103 determines not to use the unlicensed frequency band.

In addition, in the case that a cell where the apparatus 100 is located has already occupied the unlicensed frequency band to perform communications, the receiving unit 102 is further configured to receive an access requesting signal from another communication system or receive a signal from the user equipment indicating that the user equipment has received the access requesting signal from another communication system.

The above apparatus 100, with the assistance of the user equipment, can not only know the occupation status of the unlicensed frequency band more accurately, but also achieve information interchange between communication systems belonging to different operators, thereby achieving common cooperation on the unlicensed frequency band.

Second Embodiment

Figure 5:
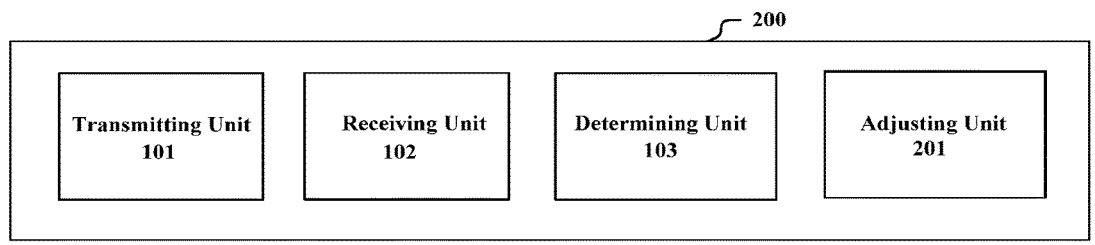
FIG. 5 shows a block diagram of a structure of an apparatus at a base station side for wireless communications according to another embodiment of the present disclosure.

A structure of an apparatus 200 at a base station side for wireless communications according to another embodiment of the present disclosure is described with reference to FIG. 5 hereinafter. As shown in FIG. 5, besides the respective components described by referring to FIG. 1, the apparatus 200 further includes an adjusting unit 201 configured to: adjust a transmission pattern of a cell where the apparatus 200 is located on the unlicensed frequency band, such that the cell where the apparatus 200 is located and the another communication system requesting to access alternately transmit data in cooperation on the unlicensed frequency band, when the receiving unit 102 receives an access requesting signal from the another communication system or receives a signal from a user equipment indicating that the user equipment has received the access requesting signal from the another communication system.

Figure 6:
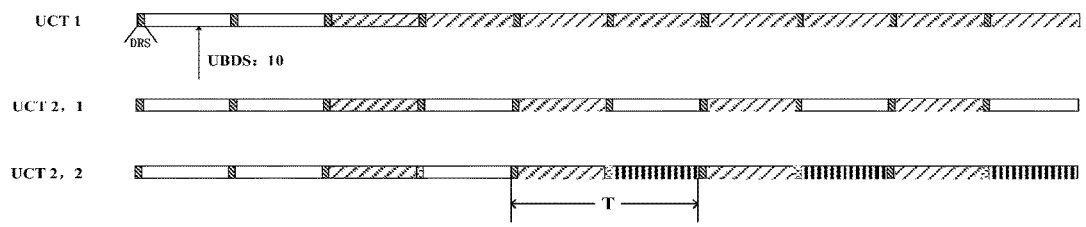
FIG. 6 shows a schematic diagram of an unlicensed frequency band cooperation transmission pattern (UCT)

FIG. 6 shows a group of examples of the transmission patterns. In FIG. 6, a case that cells transmit data on the unlicensed frequency band is shown in a time direction. In this case, two LTE cells are considered, the grey filling areas indicate time sections for DRS transmitting of the cell 1, slash filled areas indicate time sections for data transmission of the cell 1, dotted line filling areas indicate time sections for DRS transmitting of a cell 2, vertical line filling areas indicate time sections for data transmission of the cell 2, and blank areas indicate time sections with no data transmission.

It is assumed that the cell 1 is a cell initially accessed, that is, the unlicensed frequency band is idle when the cell 1 is accessed. As described above, the transmitting unit 103 of the apparatus 200 for the base station side of the cell 1 transmits DRS periodically on the unlicensed frequency band, and transmits UBDS 10 to the user equipment to instruct the user equipment to start to detect the DRS on the unlicensed frequency band. Data transmission is started after the base station and the user equipment are synchronized. Since only one unlicensed communication system occupies the unlicensed frequency band, the transmission pattern is UCT1, that is, the cell 1 occupies the whole frequency band to transmit data.

When the receiving unit 201 corresponding to the cell 1 receives an access requesting signal of a cell 2 or receives a signal from the user equipment indicating that the user equipment has received the access requesting signal from the cell 2, the adjusting unit 201 adjusts the transmission pattern of the cell 1, so as to vacate resources for the cell 2 to be accessed.

The transmission pattern may include a period set for alternately transmitting data in cooperation and a section in the period for the cell where the apparatus is located to transmit data. As an exemplary configuration, the cell where the apparatus 200 is located and another communication system requesting to access may occupy respective sections in the period according to a time order of accessing.

In the example shown in FIG. 6, the cell 1 automatically adjusts to a transmission pattern UCT 2, 1, and the cell 2 performs transmission in a pattern UCT 2, 2. That is, it is assumed that a period of unlicensed frequency band cooperation transmission (UCT) is T, the cell 1 occupies the first T/2 to perform transmission, and the cell 2 occupies the second T/2 to perform transmission. Here, T may be an integer times of a length of one wireless frame for example.

Specifically, after the cell 1 performs the adjustment, its corresponding transmitting unit 101 transmits UBDS 10 to the user equipment to instruct the user equipment to redetect the DRS. The base station of the cell 2 monitors the unlicensed frequency band, transmits its DRS in the monitored blank time, and then counting a blank time of T/2 and further waiting for T/2 (the transmission time of the cell 1) so that the cell 2 may access in the unlicensed frequency band. Similarly, the transmitting unit 101 corresponding to the cell 2 also needs to transmit the UBDS 10 to its user equipment to instruct the user equipment to start to detect the DRS.

Although the operation of the adjusting unit 201 is described by taking two cells as an example, it is not limited thereto, and the adjusting unit 201 may be similarly applied to the case that there are multiple cells already occupying the unlicensed frequency band. In this case, the adjusting unit 201 is further configured to adjust, when another communication system occupying the unlicensed frequency band adjusts the transmission pattern, the transmission pattern of the cell where the apparatus 200 is located on the unlicensed frequency band accordingly.

For example, when the cell 1 and the cell 2 already occupy the unlicensed frequency band and a cell 3 requests to access in the frequency band, it may be configured as follows: no matter either the cell 2 or the cell 1 detects the access requesting of the cell 3 firstly, the cell 2 accessed later stops transmitting data, waits until the cell 1 accessed earlier changes the transmission pattern, and then changes the transmission pattern accordingly. The process of accessing is similar to the process of accessing for 2 cells, which is not described in detail here. Of course, there may be other configurations. For example, in the case that the cell detecting the access requesting of the cell 3 is not the cell 1 accessed the earliest, the cell may notify the cell 1 of the information of detecting a new cell to be accessed, such that the cell 1 changes its transmission pattern, and then other cells change the transmission pattern accordingly.

When there are n unlicensed communication systems in total performing cooperation transmission on the unlicensed frequency band and it is assumed that T is m times of a length of a wireless frame, where m is a positive integer, k frames are allocated to each communication system, k=⌊m/n⌋. The communication systems accessed initially are allocated the remaining frames on average.

However, in the case of the hidden base station, for example referring back to FIG. 2, if the user 2 of the base station A is located at a left side, the user 2 may be not detected since the user 2 is far away from the base station B, that is, the base station A and its user equipments both do not detect the base station B. In this case, the base station A determines that the unlicensed frequency band is idle, and thus accesses in the unlicensed frequency band in a mode UCT 1. In this case, the base station A produces severe interferences on the user of the base station B when transmitting data.

Therefore, in the case that the cell where the apparatus 200 is located is occupies the unlicensed frequency band to perform communications and the interferences increase to exceed a predetermined value, the determining unit 103 determines to stop communication and the transmitting unit 101 is configured to transmit an access requesting signal by broadcasting on the unlicensed frequency band. In other words, the cell where the apparatus 200 is located accesses in the unlicensed frequency band again.

As described above, the apparatus 200 achieves cooperation transmission of multiple unlicensed communication systems on the unlicensed frequency band.

Third Embodiment

Figure 7:
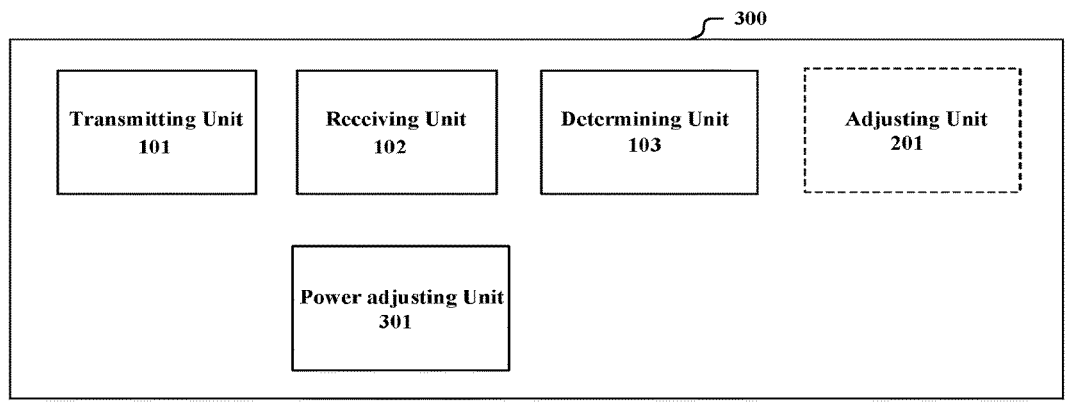
FIG. 7 shows a block diagram of a structure of an apparatus for a base station of wireless communications according to another embodiment of the present disclosure.

Hereinafter a block diagram of a structure of an apparatus 300 at a base station side for wireless communications according to another embodiment of the present disclosure is described with reference to FIG. 7. As shown in FIG. 7, besides the respective components described by referring to FIG. 1, the apparatus 300 further includes a power adjusting unit 301 configured to adjust, based on a distribution of respective user equipments of the cell where the apparatus 300 is located and interferences on the unlicensed frequency band detected by the respective user equipments, a transmitting power of a base station, when the determining unit 103 determines to perform communications using the unlicensed frequency band.

In some examples of the present disclosure, the unlicensed frequency band only functions as a secondary carrier, and thus the transmission power required for transmitting on the unlicensed frequency band can be limited just to ensure that a target user may receive the transmitted data, and the secondary carrier does not need to cover a range of the whole cell as a primary carrier does. Therefore, interferences on other unlicensed communication systems may be reduced by reducing the transmission power on the unlicensed frequency band.

Figure 8:
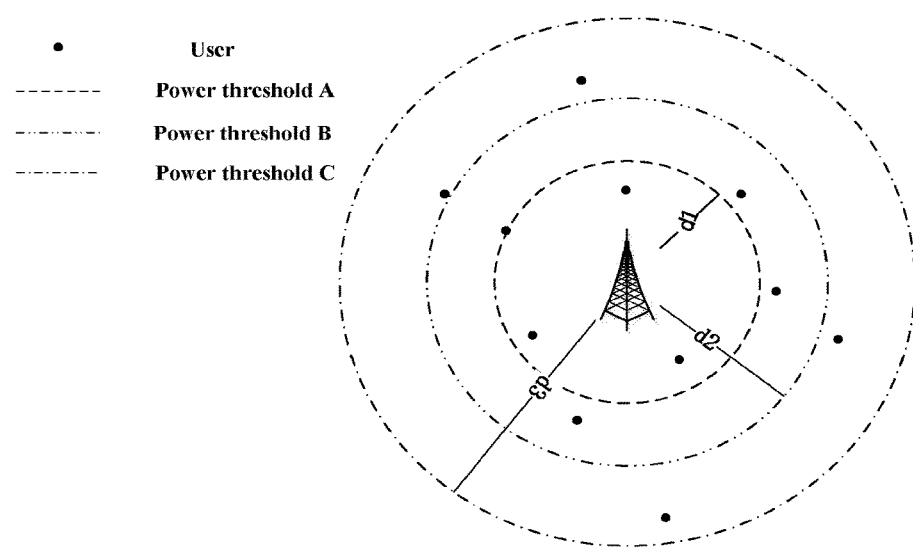
FIG. 8 shows a schematic diagram of a distribution of a base station and user equipments in a cell.

FIG. 8 shows a schematic diagram of a distribution of a base station and user equipments in a cell. The base station may know the distribution conditions of its users, for example in various manners such as calculating based on Timing Advance (TA), GPS positioning or determining according to a position reference signal and so on. In FIG. 8, three transmission power thresholds A, B and C are set according to a distance between the user equipment and the base station. That is, when a distance from a user to the base station is within d1, the maximum power transmitted from the base station to the user is limited to A; when the distance from the user to the base station is between d1 and d2, the power is limited between A and B, and so on. In addition, the interferences on the unlicensed frequency band detected by the user equipment are also taken into consideration when determining the transmitting power. Specifically, if the interferences are high, the transmitting power of the base station is set to be high so as to ensure that the user equipment may receive data; otherwise, the transmitting power may be reduced accordingly, thereby reducing energy consumption effectively, and reducing influence on other communication systems performing transmission.

It should be understood that, although the above description mentions adjusting the transmitting power according to the interferences, the values of the interferences here involved may be all lower than the interference threshold TH described in the first embodiment, and high and low are just relative. As an example, the interference value may be transmitted together with the transmission of the signal indicating the occupation status of the unlicensed frequency band by the user equipment to the base station, or the interference value may be reported by the user equipment after the apparatus 300 determines to perform communications using the unlicensed frequency band. After the power adjusting unit 301 determines the transmitting power of the base station as above, the base station and the user equipment may transmit data with this power.

In addition, as shown in FIG. 7, the apparatus 300 may further include the adjusting unit 201 described in the second embodiment, which has the same function and structure as that in the second embodiment and is not repeated here.

The apparatus 300 sets the transmitting power of the base station according to the distribution conditions of the user equipments and the interferences respectively detected by the user equipments, such that power consumption can be reduced and interferences on the accessed communication systems can be reduced as much as possible, under the condition of ensuring the communication quality.

Fourth Embodiment

Hereinafter a structure of an apparatus 400 at a user side for wireless communications according to an embodiment of the present disclosure is described with reference to FIG. 9. The apparatus 400 includes: a receiving unit 401, configured to receive, from a base station serving the apparatus 400, an instruction on detection of an unlicensed frequency band; a detecting unit 402, configured to detect an occupation status of the unlicensed frequency band; and a transmitting unit 403 configured to transmit, according to the occupation status detected by the detecting unit 402, an unlicensed band state indication signal (USIS) to the base station, where the occupation status of the unlicensed frequency band includes occupied/idle and a type of a system occupying the unlicensed frequency band, and the type of the system occupying the unlicensed frequency band includes an unlicensed communication system and a licensed communication system.

As described in the first embodiment, the user equipment assists in detecting the unlicensed frequency band, thereby obtaining more accurate information on the occupation status of the unlicensed frequency band. The instruction on detection of the unlicensed frequency band may be as that described in the first embodiment, and practically the instruction may have other forms, as long as the instruction may trigger detection of the detecting unit 402.

As an example, the receiving unit 401 may receive the above instruction by receiving RRC signaling on a licensed frequency band, or receive the above instruction by receiving a system information block SIB on the licensed frequency band.

In an embodiment, the detecting unit 402 is configured to detect interferences on the unlicensed frequency band. In the case that the interferences are lower than a predetermined threshold, the transmitting unit 403 transmits an indication signal of the unlicensed frequency band being idle to the base station; and in the case that the interferences are higher than the predetermined threshold, the detecting unit 402 detects a type of an occupying system producing the interferences, and the transmitting unit 403 transmits an indication signal of the type of the occupying system for the system which occupies the unlicensed frequency band to the base station. The predetermined threshold may be the threshold TH described in the first embodiment for example. In the case that the interferences are lower than the threshold TH, it indicates that interferences from other communication systems are small and may be neglected, and hence a communication system of the apparatus 400 may occupy the unlicensed frequency band; otherwise, it indicates that the unlicensed frequency band is used by other communication systems. In this case, the detecting unit 402 needs to identify a type of the communication system which is using the unlicensed frequency band. Taking the LTE system and the Wi-Fi system as examples, if it is assumed that the Wi-Fi system is a licensed communication system and the LTE system is an unlicensed communication system for the unlicensed frequency band, the detecting unit 402 needs to identify whether the accessed communication system is the LTE system or the Wi-Fi system.

In an example, the unlicensed communication system is the LTE system, and the detecting unit 402 distinguishes a non-LTE signal and an LTE signal by detecting whether there is a PSS/SSS on the unlicensed frequency band, so as to determine a type of the occupying system. Specifically, if there is a PSS/SSS, the occupying system is determined as the LTE system; otherwise, the occupying system is determined as the non-LTE system.

In addition, the detecting unit 402 may be further configured to detect a physical cell ID (PCI) of a communication system which transmits data on the unlicensed frequency band, and judge, based on the PCI, whether the communication system which transmits data on the unlicensed frequency band and the base station serving the apparatus 400 belong to the same operator. The transmitting unit 403 is configured to transmit an unlicensed frequency band state indication signal to the base station in the case that the communication system and the base station do not belong to the same operator. In the case that the communication system and the base station belong to the same operator, it is not necessary to communicate information via the user equipment since base stations belonging to the same operator may cooperate directly.

FIG. 10 shows an example of definition of an unlicensed frequency band state indication signal. The unlicensed frequency band state indication signal occupies 2 bits. "00" indicates that it is detected that the unlicensed frequency band is not occupied by any communication system, "01" indicates that it is detected that the unlicensed frequency band is occupied by a licensed communication system (for example a Wi-Fi system), and "10" indicates that it is detected that other unlicensed communication system is already transmitting data using the unlicensed frequency band. In the example shown in FIG. 10, "01" and "10" may also be referred as an indication signal of the type of the occupying system.

When the apparatus 400 already occupies the unlicensed frequency band to perform communications, the detecting unit 402 is further configured to periodically detect an access requesting signal for requesting to access in the unlicensed frequency band which is broadcasted by another communication system on the unlicensed frequency band. As an example, the access requesting signal may include an MBSFN sub-frame and a DRS signal.

When the access requesting signal is detected, the transmitting unit 403 transmits an indication signal indicating that another communication system requests to access in the unlicensed frequency band to the base station. In the example shown in FIG. 10, the indication signal may be defined as "11" of the unlicensed frequency band state indication signal. As described in the second embodiment, when the base station receives the indication signal, the base station may know that there is another unlicensed communication system requesting to access in the unlicensed frequency band, thereby adjusting its transmission pattern accordingly to achieve common cooperation transmission.

In another aspect, for example, when the transmitting unit 403 transmits USTS "00" to the base station or a base station corresponding to the apparatus 400 is responded after transmitting the access requesting signal, the receiving unit 401 is further configured to receive, from the base station, an instruction for instructing to start to detect a discovery reference signal DRS of the present cell on the unlicensed frequency band. The instruction may be UBDS "10" described in the first embodiment for example. As shown in FIG. 11, the apparatus 400 further includes a synchronizing unit 404 configured to perform coarse synchronization with the base station based on the DRS. It should be understood that, the synchronizing unit 404 may synchronize with the base station using any existing synchronization technology.

In the third embodiment, it is mentioned that the transmitting power is adjusted at the base station side according to the distribution of user equipments and the interferences on the unlicensed frequency band detected by the user equipments. Therefore, accordingly, the transmitting unit 403 may be configured to transmit information about the detected amount of interferences produced by other communication systems while transmitting the unlicensed frequency band state indication signal to the base station. The information is used as a basis for determining the transmitting power.

In summary, the apparatus 400 according to the embodiment may detect an occupation status of the unlicensed frequency band and receive an access requesting signal broadcasted by other communication systems, thereby assisting in using the unlicensed frequency band or using the unlicensed frequency band in cooperation. As an example, the apparatus 400 may be implemented as a mobile terminal (such as a smart phone, a tablet personal computer (PC), a notebook PC, a portable game terminal, a portable/dongle mobile router and a digital capturing apparatus) or a vehicle terminal (such as a vehicle navigation device). The apparatus 400 may also be implemented as a terminal performing machine to machine (M2M) communication (also referred to as a machine type communication (MTC) terminal). In addition, the apparatus 400 may be a wireless communication module (such as an integration circuit module including a single chip) installed on each of the above terminals.

In addition, in the above embodiments, there is only one unlicensed frequency band, but the above embodiments may also adapt to the case that there are multiple unlicensed frequency bands. In this case, an extra field may be set in the instruction on the detection of the unlicensed frequency bands to specify the aimed unlicensed frequency band.

Fifth Embodiment

In the process of describing the apparatus for a base station side and a user side of wireless communications in the embodiments described above, obviously, some processing or methods are disclosed. Hereinafter, an overview of the methods is given without repeating some details disclosed above. However, it should be noted that, although the methods are disclosed in a process of describing the apparatus for the base station side and the user side of wireless communications, the methods do not certainly employ or are not certainly executed by the aforementioned components. For example, the embodiments of the apparatus for a base station side and a user side of wireless communications may be partially or completely implemented with hardware and/or firmware. The methods for a base station side and a user side of wireless communications discussed below may be executed by a computer-executable program completely, although the hardware and/or firmware of the apparatus for a base station side and a user side of wireless communications can also be used in the methods.

Figure 12:
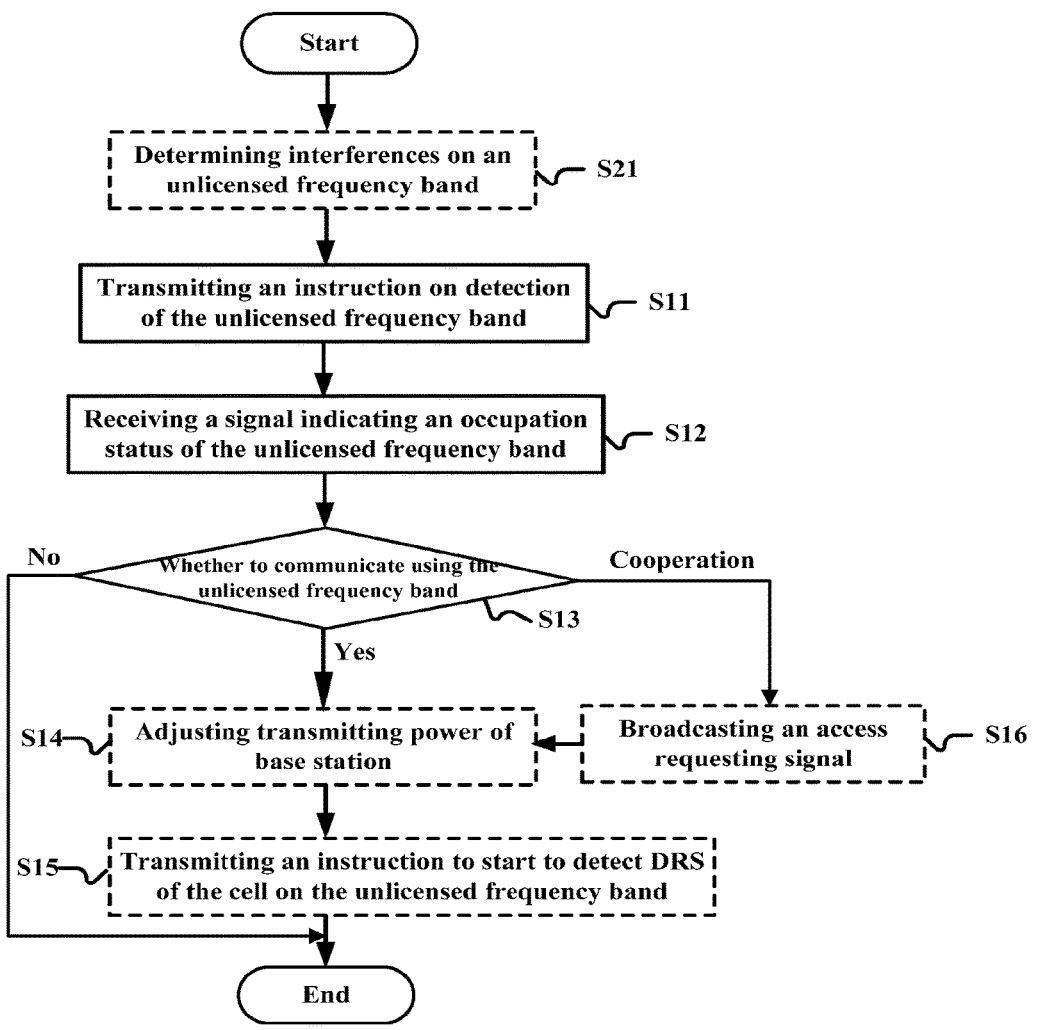
FIG. 12 shows a flowchart of a method at a base station side for wireless communications according to an embodiment of the present disclosure.

FIG. 12 shows a flowchart of a method at a base station side for wireless communications according to an embodiment of the present disclosure. The method includes the following steps: transmitting an instruction on detection of an unlicensed frequency band to a user equipment (S11); receiving, from the user equipment, a signal indicating an occupation status of the unlicensed frequency band (S12); and determining, based on the received signal, whether to perform communications using the unlicensed frequency band (S13), where the occupation status of the unlicensed frequency band includes occupied/idle and a type of a system occupying the unlicensed frequency band, and the type of the system occupying the unlicensed frequency band includes an unlicensed communication system and a licensed communication system.

As an example, the licensed communication system may be a Wi-Fi system, and the unlicensed communication system may be an LTE system.

In step S11, the instruction may be transmitted via RRC signaling on a licensed frequency band, or the instruction may be transmitted via a system information block SIB on the licensed frequency band. Specific examples of signaling setting are described in detail in the first embodiment, which are not repeated here.

As an example, in step S13, it is determined to perform communications using the unlicensed frequency band in the case that the unlicensed frequency band is determined to be idle based on the received signal, the processing proceeds to step S15. In step S15, an instruction to start to detect a discovery reference signal DRS of the present cell on the unlicensed frequency band is transmitted to the user equipment, where the DRS is used by the user equipment to perform coarse synchronization. The base station transmits the DRS periodically on the unlicensed frequency band.

In addition, before step S15 is performed, step S14 may also be performed. That is, a transmitting power of the base station is adjusted according to a distribution of respective user equipments in a cell corresponding the base station and interferences on the unlicensed frequency band detected by the respective user equipments. By performing the step S14, energy consumption can be further reduced and interferences on other communication systems can be reduced while ensuring the communication quality.

In another aspect, in step S13, in the case that it is determined, based on the received signal, that the unlicensed frequency band is occupied by a licensed communication system such as the Wi-Fi system described above, it is determined not to use the unlicensed frequency band, and the processing ends.

On the other hand, when it is determined in step S13 that the unlicensed frequency band is occupied by an unlicensed communication system based on the received signal, it is determined to share the unlicensed frequency band in a cooperation manner with the unlicensed communication system, and the processing proceeds to step S16. In step S16, an access requesting signal is broadcasted on the unlicensed frequency band. The access requesting signal may be detected by a base station or a user equipment of an unlicensed communication system already accessed in the unlicensed frequency band. When another unlicensed communication system detects the access requesting signal, the another unlicensed communication system would change its transmission pattern, such that the current communication system may be accessed. After the current communication system is admitted to access and before the current communication system can transmit data, processing of step S15 is further performed. That is, an instruction to start to detect the DRS of the present cell on the unlicensed frequency band is transmitted to the user equipment, such that the user equipment and the base station can perform coarse synchronization.

Referring again to FIG. 12, the method may further include step S21 before step S11. In step S21, interferences on the unlicensed frequency band are determined before the instruction is transmitted, and an instruction to detect the unlicensed frequency band is transmitted to the user equipment in the case that the interferences are lower than a predetermined threshold.

In addition, in the case that the interferences are higher than the predetermined threshold, it is judged whether the interferences are from an unlicensed communication system or a licensed communication system. If the interferences are from the unlicensed communication system, an access requesting signal is broadcasted on the unlicensed frequency band, i.e., the processing of step S16 is performed. If the interferences are from the licensed communication system, an instruction not to detect the unlicensed frequency band is transmitted to the user equipment or no instruction on detection of the unlicensed frequency band is transmitted to the user equipment. After step S16 is performed, similarly, step S14 may be performed before step S15 is performed. In step S14, the transmitting power of the base station is adjusted according to a distribution of respective user equipments in the cell corresponding to the base station and interferences on the unlicensed frequency band detected by the respective user equipments.

The above access requesting signal may include an MBSFN sub-frame and a DRS signal. In step S16, a power of the access requesting signal may be increased within a certain range, such that the access requesting signal is detected by other communication systems which have occupied the unlicensed frequency band. When the power of the access requesting signal reaches an upper limit of the range and the access requesting signal is not detected by another communication system, transmission of the access requesting signal is stopped, and it is determined not to use the unlicensed frequency band.

Figure 13:
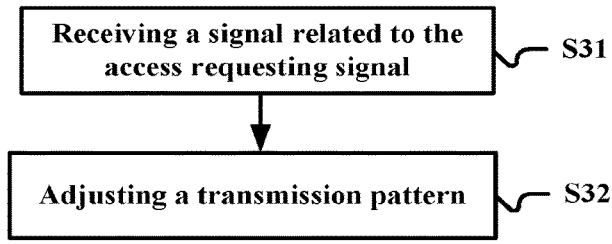
FIG. 13 shows a flowchart of a method at a base station side for wireless communications according to an embodiment of the present disclosure.

In the case that the cell corresponding to the base station already occupies the unlicensed frequency band to perform communication, as shown in FIG. 13, the method further includes: receiving an access requesting signal from another communication system or receiving a signal from the user equipment indicating that the user equipment has received the access requesting signal from another communication system (S31); and adjusting a transmission pattern of the cell corresponding to the base station on the unlicensed frequency band (S32), such that the cell corresponding to the base station and the another communication system requesting to access alternately transmit data in cooperation on the unlicensed frequency band.

In step S32, it is possible to adjust a transmission pattern of the cell corresponding to the base station on the unlicensed frequency band accordingly, when another communication system occupying the unlicensed frequency band adjusts the transmission pattern.

In an example, the transmission pattern includes a period set for alternately transmitting data in cooperation and sections in the period for transmitting data by the cell corresponding to the base station. The cell corresponding to the base station and the another communication system requesting to access may occupy respective sections in the period according to a time order of accessing.

The above method may further include: determining to stop communication and transmitting an access requesting signal by broadcasting on the unlicensed frequency band, in the case that the cell corresponding to the base station occupies the unlicensed frequency band to perform communication and the interferences increase to exceed a predetermined value. The step is performed in the case that the another communication system requesting to access accesses by mistake since the present base station is a hidden station for the base station of the another communication system.

Hereinafter, a method at a user side for wireless communications according to an embodiment of the present disclosure is described with reference to FIG. 14. The method includes the following steps: receiving an instruction on detection of an unlicensed frequency band from a base station (S41); detecting an occupation status of the unlicensed frequency band (S42); transmitting, according to the detected occupation status, an unlicensed frequency band state indication signal to the base station (S43), where the occupation status of the unlicensed frequency band includes occupied/idle and a type of a system occupying the unlicensed frequency band, and the type of the system occupying the unlicensed frequency band includes an unlicensed communication system and a licensed communication system.

In step S41, the instruction may be received via RRC signaling on a licensed frequency band, or the instruction may be received via a system information block SIB on the licensed frequency band.

In step S42, interferences on the unlicensed frequency band may be detected. In the case that the interferences are lower than a predetermined threshold, in step S43, an indication signal of the unlicensed frequency band being idle is transmitted to the base station. In the case that the interferences are higher than the predetermined threshold, in step S42, a type of an occupying system producing the interferences is further detected, i.e., whether the occupying system is a licensed communication system or an unlicensed communication system is judged; and in step S43, an indication signal of the type of the occupying system is transmitted to the base station. The indication signal of the type of the occupying system may be a part of the unlicensed frequency band state indication signal, and specific examples are described previously, which are not repeated here.

As an example, in step S42, a PCI of a communication system transmitting data on the unlicensed frequency band may be detected, and it is judged, based on the PCI, whether the communication system transmitting data on the unlicensed frequency band and a base station serving the user belong to the same operator. Step S43 is performed only in the case that the communication system and the base station do not belong to the same operator, since base stations belonging to the same operator can cooperate directly not requiring to communicate information via the user equipment.

In addition, in step S43, information about the detected amount of interferences produced by other communication systems may be transmitted while transmitting the unlicensed frequency band state indication signal, such that the base station may adjust a transmitting power according to the information.

In an example, the unlicensed communication system is an LTE system. In step S42, a non-LTE signal and an LTE signal may be distinguished by detecting whether there is a PSS/SSS on the unlicensed frequency band, so as to determine a type of the occupying system.

Figure 14:
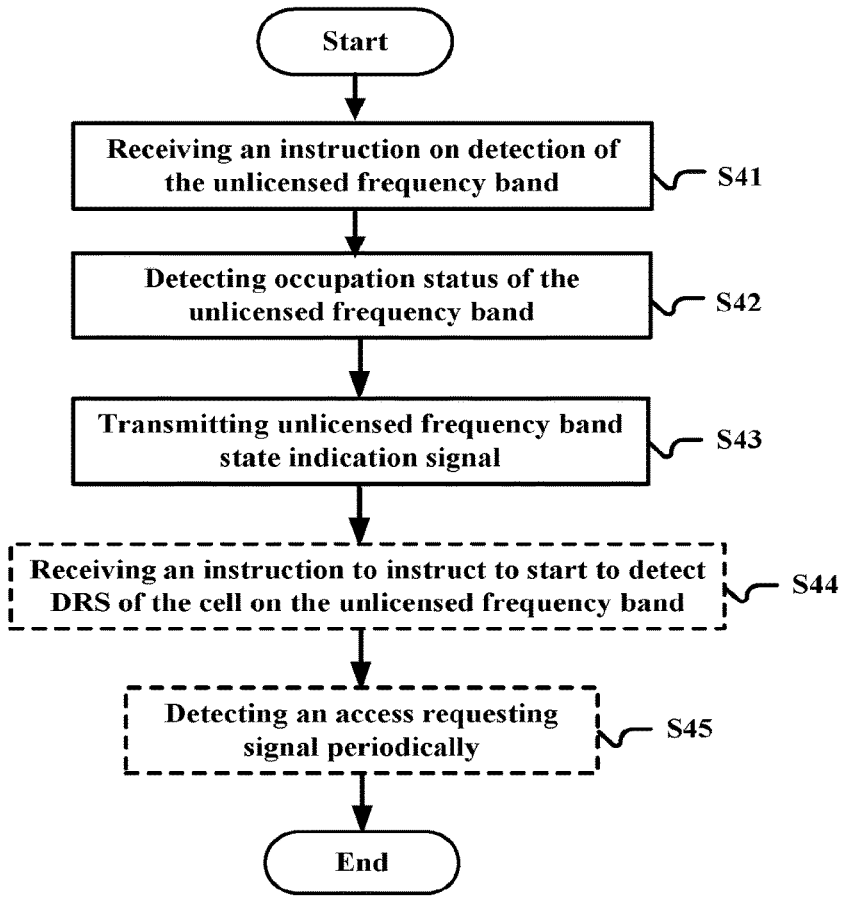
FIG. 14 shows a flowchart of a method at a user side for wireless communications according to an embodiment of the present disclosure.

As shown in FIG. 14, the above method may include step S44: receiving, from the base station, an instruction for instructing to start to detect a DRS of the present cell on the unlicensed frequency band, to perform coarse synchronization with the base station based on the DRS.

In addition, when a cell where the user is located has occupied the unlicensed frequency band to perform communication, the method may further include step S45: periodically detecting an access requesting signal for requesting to access in the unlicensed frequency band which is broadcasted by another communication system on the unlicensed frequency band. When the access requesting signal is detected, an indication signal indicating that another communication system requests to access in the unlicensed frequency band is transmitted to the base station. After receiving the indication signal, the base station may adjust its transmission pattern, so as to share the unlicensed frequency band in cooperation with the another communication system.

As described above, the access requesting signal may include an MBSFN sub-frame and a DRS signal.

With the above method, an occupation status of the unlicensed frequency band can be acquired more accurately, and common cooperation of multiple unlicensed communication systems on the unlicensed frequency band is achieved.

Figure 15:
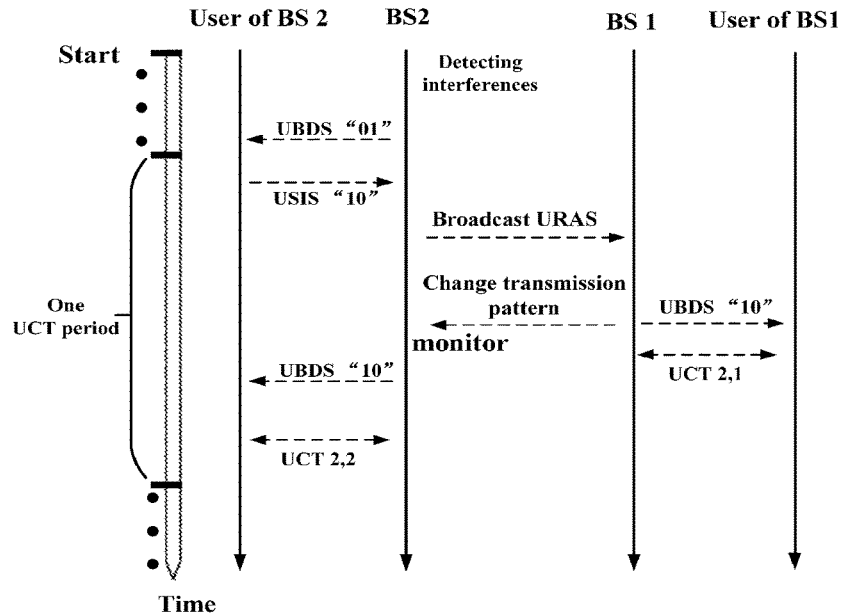
FIG. 15 shows a schematic diagram of signaling flowchart of an example of a system.

The apparatus and method for a base station side and a user side of wireless communications according to the present disclosure are described above. In order to facilitate understanding, an example of a system is described with reference to FIG. 15 in the following. The unlicensed communication system is an LTE system, the licensed communication system is a Wi-Fi system, and a base station and users of an LTE cell adopt the signaling setting shown in FIG. 3 and FIG. 10 respectively. The base station 1 has accessed in the unlicensed frequency band, and the base station 2 expects to use resources of the unlicensed frequency band during this time period. The vertical direction represents a timeline. It should be noted that, FIG. 15 is only a schematic diagram, which does not indicate strict timing relationship.

Firstly, the base station 2 detects interferences on the unlicensed frequency band and finds that the interferences are lower than a predetermined threshold. Therefore, the base station 2 transmits UBDS "01" to its user to instruct the user to detect the unlicensed frequency band. After receiving the UBDS "01", the user of the base station 2 starts to detect interferences on the frequency band around it, and detects that there is one PCI on the frequency band. The user feeds back USIS "10" to the base station 2 to notify the base station 2 that there is another LTE user on the current frequency band. After receiving the USIS "10", the base station 2 broadcasts on the unlicensed frequency band to transmit URAS. In this way, the base station 1 or the user of the base station 1 would detect that another LTE user is requesting to access in the frequency band. In the case that it is detected by the user of the base station 1, the user of the base station 1 transmits USIS "11" to the base station 1 to notify the base station 1 of the information. Subsequently, the base station 1 automatically adjusts its transmission pattern from UCT1 into UCT 2,1, and retransmits UBDS "10" to its user to instruct the user to redetect a DRS.

After transmitting the URAS, the base station 2 monitors the unlicensed frequency band, and transmits its DRS when detecting a blank section. Similarly, the base station 2 transmits UBDS "10" to its user to instruct the user to start to detect the DRS. Finally, the base station 2 performs transmission in a pattern UCT 2, 2.

It should be understood that, the system example is not intended to limit, and is provided only for understanding.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Those skilled in the art may understand that the determining unit, the adjusting unit, the power adjusting unit and so on in the apparatus described above may be implemented by one or more processors. The transmitting unit, the receiving unit and the detecting unit and so on may be implemented by circuit elements such as an antenna, a filter, a modem, a codec and the like.

Therefore, an electronic device (1) is further provided according to the present disclosure, which includes: a circuit configured to: transmit an instruction on detection of an unlicensed frequency band to a user equipment; receive, from the user equipment, a signal indicating an occupation status of the unlicensed frequency band; and determine, based on the received signal, whether to perform communications using the unlicensed frequency band, where the occupation status of the unlicensed frequency band includes occupied/idle and a type of a system occupying the unlicensed frequency band, and the type of the system occupying the unlicensed frequency band includes an unlicensed communication system and a licensed communication system.

An electronic device (2) is further provided according to the present disclosure, which includes: a circuit configured to: receive an instruction on detection of an unlicensed frequency band from a base station; detect an occupation status of the unlicensed frequency band; and transmit, according to the detected occupation status, an unlicensed frequency band state indication signal to the base station, where the occupation status of the unlicensed frequency band includes occupied/idle and a type of a system occupying the unlicensed frequency band, and the type of the system occupying the unlicensed frequency band includes an unlicensed communication system and a licensed communication system.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1600 shown in FIG. 16) from a storage medium or network, wherein the computer is capable of implementing various functions when installed with various programs.

Figure 16:
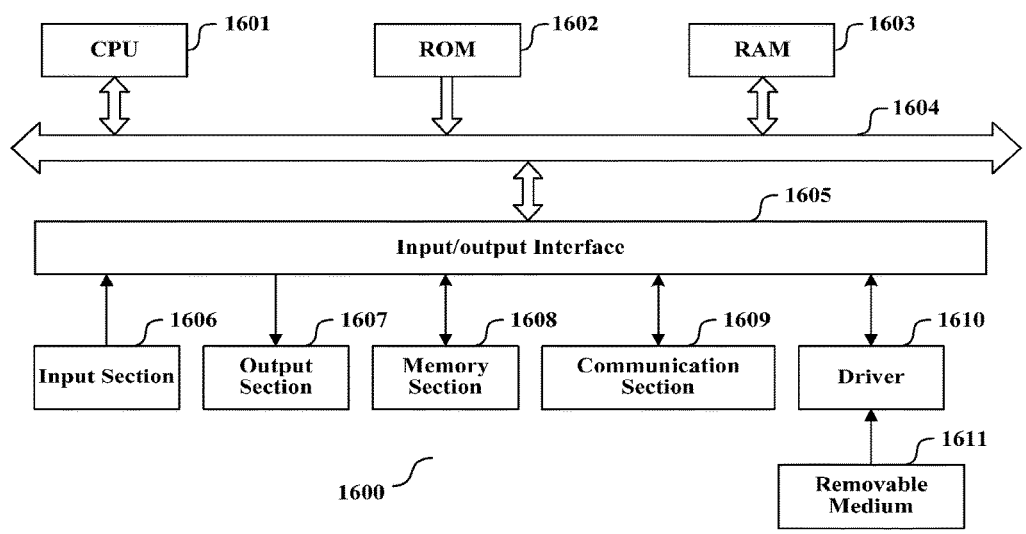
FIG. 16 is an exemplary block diagram illustrating the structure of a general purpose personal computer capable of realizing the method and/or device and/or system according to the embodiments of the present invention.

In FIG. 16, a central processing unit (CPU) 1601 executes various processing according to a program stored in a read-only memory (ROM) 1602 or a program loaded to a random access memory (RAM) 1603 from a memory section 1608. The data needed for the various processing of the CPU 1601 may be stored in the RAM 1603 as needed. The CPU 1601, the ROM 1602 and the RAM 1603 are linked with each other via a bus 1604. An input/output interface 1605 is also linked to the bus 1604.

The following components are linked to the input/output interface 1605: an input section 1606 (including keyboard, mouse and the like), an output section 1607 (including displays such as a cathode ray tube (CRT), a liquid crystal display (LCD), a loudspeaker and the like), a memory section 1608 (including hard disc and the like), and a communication section 1609 (including a network interface card such as a LAN card, modem and the like). The communication section 1609 performs communication processing via a network such as the Internet. A driver 1610 may also be linked to the input/output interface 1605. If needed, a removable medium 1611, for example, a magnetic disc, an optical disc, a magnetic optical disc, a semiconductor memory and the like, may be installed in the driver 1610, so that the computer program read therefrom is installed in the memory section 1608 as appropriate.

In the case where the foregoing series of processing is achieved by software, programs forming the software are installed from a network such as the Internet or a memory medium such as the removable medium 1611.

It should be appreciated by those skilled in the art that the memory medium is not limited to the removable medium 1611 shown in Figure, which has program stored therein and is distributed separately from the apparatus so as to provide the programs to users. The removable medium 1611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1602 and the memory section 1608 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for wireless communications, comprising:
   processing circuitry configured to:
   transmit, to a user equipment served by a cell where the apparatus is located, an instruction on detection of an unlicensed frequency band;
   receive, from the user equipment, a signal indicating an occupation status of the unlicensed frequency band; and
   determine, based on the signal received, whether to perform communications using the unlicensed frequency band,
   wherein the occupation status of the unlicensed frequency band comprises occupied/idle and a type of a system occupying the unlicensed frequency band, the type of the system occupying the unlicensed frequency band comprising one of an unlicensed communication system and a licensed communication system, and wherein the processing circuitry is further configured to determine to perform communications using the unlicensed frequency band in a case that the unlicensed frequency band is idle, the processing circuitry is further configured to transmit to the user equipment an instruction to start to detect a discovery reference signal DRS of the present cell on the unlicensed frequency band after determining to perform communications using the unlicensed frequency band, the DRS being used by the user equipment to perform synchronization, and the processing circuitry is further configured to transmit the DRS periodically on the unlicensed frequency band.

2. The apparatus according to claim 1, wherein the processing circuitry is further configured to, in a case of determining, based on the received signal, that the unlicensed frequency band is occupied by an unlicensed communication system, determine to share the unlicensed frequency band with the unlicensed communication system in a cooperation manner, and broadcast an access requesting signal on the unlicensed frequency band, and/or
   the processing circuitry is further configured to, in a case of determining, based on the received signal, that the unlicensed frequency band is occupied by a licensed communication system, determine not to use the unlicensed frequency band.

3. The apparatus according to claim 2, wherein the access requesting signal comprises an MBSFN sub-frame and a DRS signal.

4. The apparatus according to claim 2, wherein the processing circuitry is further configured to increase a power of the access requesting signal within a certain range, so that the access requesting signal can be detected by another communication system which has occupied the unlicensed frequency band.

5. The apparatus according to claim 1, wherein the processing circuitry is further configured to determine interferences on the unlicensed frequency band before transmitting the instruction, and transmit an instruction to detect the unlicensed frequency band to the user equipment when determining that the interferences are lower than a predetermined threshold.

6. The apparatus according to claim 5, wherein the processing circuitry is further configured to judge whether the interferences are from an unlicensed communication system or a licensed communication system when determining that the interferences are higher than the predetermined threshold,
   the processing circuitry is further configured to broadcast an access requesting signal on the unlicensed frequency band, in the case of determining that the interferences higher than the predetermined threshold are from the unlicensed communication system, and
   the processing circuitry is further configured not to transmit the instruction on detection of the unlicensed frequency band to the user equipment or to transmit an instruction not to detect the unlicensed frequency band to the user equipment, in a case of determining that the interferences higher than the predetermined threshold are from the licensed communication system.

7. The apparatus according to claim 1, wherein the processing circuitry is further configured to transmit the instruction via RRC signaling on a licensed frequency band.

8. The apparatus according to claim 1, wherein the processing circuitry is further configured to transmit the instruction via a system information block SIB on a licensed frequency band.

9. The apparatus according to claim 1, wherein the processing circuitry is further configured to determine to perform communications using the unlicensed frequency band in a case that the unlicensed frequency band is idle; and in a case that the cell where the apparatus is located has occupied the unlicensed frequency band to perform communications, the processing circuitry is further configured to receive an access requesting signal from another communication system, or receive, from the user equipment, a signal indicating that the user equipment has received the access requesting signal from another communication system.

10. The apparatus according to claim 9, wherein the processing circuitry is further configured to:
adjust a transmission pattern of the cell where the apparatus is located on the unlicensed frequency band, so that the cell where the apparatus is located and the another communication system requesting to access alternately transmit data in cooperation on the unlicensed frequency band, when the processing circuitry receives the access requesting signal from another communication system, or receives, from the user equipment, a signal indicating that the user equipment has received the access requesting signal from the another communication system.

11. The apparatus according to claim 10, wherein the processing circuitry is further configured to adjust the transmission pattern of the cell where the apparatus is located on the unlicensed frequency band correspondingly, when another communication system occupying the unlicensed frequency band adjusts the transmission pattern.

12. The apparatus according to claim 10, wherein the transmission pattern comprises a period set for alternately transmitting data in cooperation and a section in the period for the cell where the apparatus is located to transmit data.

13. The apparatus according to claim 1, wherein the processing circuitry is further configured to adjust, based on a distribution of respective user equipments of the cell where the apparatus is located and interferences on the unlicensed frequency band detected by the respective user equipments, a transmitting power of a base station, when determining to perform communications using the unlicensed frequency band.

14. An apparatus for wireless communications, comprising:
processing circuitry configured to:
receive, from a base station serving the apparatus, an instruction on detection of an unlicensed frequency band;
detect an occupation status of the unlicensed frequency band; and
transmit, according to the detected occupation status, an unlicensed frequency band state indication signal to the base station,
wherein the occupation status of the unlicensed frequency band comprises occupied/idle and a type of a system occupying the unlicensed frequency band, the type of the system occupying the unlicensed frequency band comprising an unlicensed communication system and a licensed communication system, and wherein the processing circuitry is further configured to receive, from the base station, an instruction to start to detect a discovery reference signal DRS of the present cell on the unlicensed frequency band, and the processing circuitry is further configured to perform synchronization with the base station based on the DRS.

15. The apparatus according to claim 14, wherein the processing circuitry is further configured to detect interferences on the unlicensed frequency band; in a case that the interferences are lower than a predetermined threshold, the processing circuitry is configured to transmit an indication signal of the unlicensed frequency band being idle to the base station; in a case that the interferences are higher than the predetermined threshold, the processing circuitry is configured to detect a type of an occupying system producing the interferences, and transmit an indication signal of the type of the occupying system for the system which occupies the unlicensed frequency band to the base station.

16. The apparatus according to claim 15, wherein the unlicensed communication system is an LTE system, and the processing circuitry is further configured to distinguish a non-LTE signal and an LTE signal by detecting whether there is a PSS/SSS on the unlicensed frequency band, to determine a type of the occupying system.

17. The apparatus according to claim 14, wherein in a case that the apparatus has occupied the unlicensed frequency band to perform communications, the processing circuitry is further configured to periodically detect an access requesting signal for requesting to access in the unlicensed frequency band which is broadcasted by another communication system on the unlicensed frequency band.

18. The apparatus according to claim 17, wherein in a case that the processing circuitry detects the access requesting signal, the processing circuitry is further configured to transmit an indication signal indicating that another communication system requests to access in the unlicensed frequency band to the base station.

* * * * *